United States Patent [19]
Desrosiers

[11] 3,950,884
[45] Apr. 20, 1976

[54] ANIMAL TRAP

[76] Inventor: Wilfrid Desrosiers, 6 Cournoyer St., Kapuskasing, Ontario, Canada

[22] Filed: Jan. 31, 1975

[21] Appl. No.: 546,103

[52] U.S. Cl. ................................................. 43/81
[51] Int. Cl.² ...................................... A01M 23/30
[58] Field of Search ...................................... 43/81

[56] References Cited
UNITED STATES PATENTS

| | | | |
|---|---|---|---|
| 2,581,628 | 1/1952 | Burwell | 43/81 |
| 3,100,361 | 8/1963 | Wanless et al. | 43/81 |
| 3,775,896 | 12/1973 | Gauthier et al. | 43/81 |

Primary Examiner—Louis G. Mancene
Assistant Examiner—Daniel J. Leach

[57] ABSTRACT

A trap of the type particularly adapted to quickly kill a caught animal, to operate equally on an animal approaching from either of two opposite directions, and to reliably trigger the action when the animal is in proper position to be struck at the neck such as to ensure quick killing and prevent escape thereof. This animal trap includes two pairs of jaws arranged back to back, one jaw of each pair pivoting toward an upstanding open position adjoining the other one jaw of the other pair of jaws, a pair of treadle plates pivoted relative to the other two jaws respectively, and connected to a simple and easy acting latch to trigger the same upon stepping of an animal onto either of the two treadle plates.

9 Claims, 6 Drawing Figures

ANIMAL TRAP

This invention relates to a trap for an animal and particularly to a trap of the type adapted to kill the caught animal.

This invention thus defines a trap of much the same type as the one defined in the copending U.S. patent application No. 457,377, filed by the same inventor on Apr. 2, 1974.

As defined in the above-mentioned document, it is required that such animal trap produce quick killing of the caught animal. Efficient killing of the animal is most preferably done by striking the latter on the neck while striking the same elsewhere on its body seriously compromises the possibility of performing the execution within the time limit defined by Humane Societies and may even result in escape of the animal.

It is a general object of the present invention to provide an animal trap of the above type which is adapted to more reliably strike the animal in an appropriate manner to produce quick death and to prevent escape thereof and which is equally effective on an animal approaching from either of two opposite directions.

It is another general object of the present invention to provide an animal trap of the above type which is particularly adapted to strike the animal at the neck to more reliably produce the death within the prescribed time limit while minimizing the possibility of escape.

It is a more specific object of the present invention to provide an animal trap of the above type, which uses treadles to trigger the deadly action such as to ensure correct positioning of the animal's neck relative to the striking member, and which also uses a latch and trigger assembly which is easy to operate and does not oppose any substantial resistance to closing of the trap.

The above and other objects and advantages of the present invention will be better understood in the light of the following detailed description of preferred embodiments thereof which are illustrated, by way of example, in the accompanying drawings, wherein.

Figure 1:
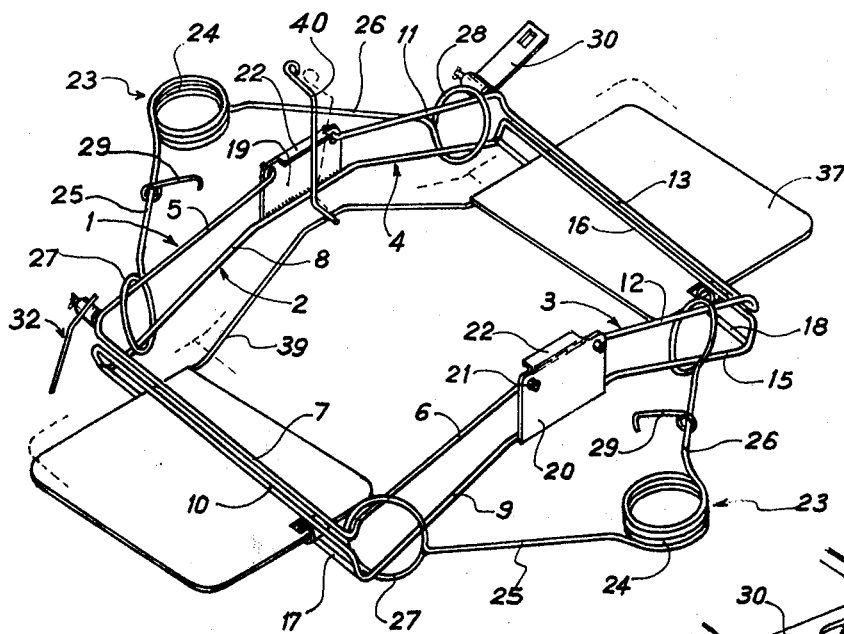
FIG. 1 is a perspective view of an animal trap according to a first embodiment of the present invention and shown in closed position.
Figure 3:
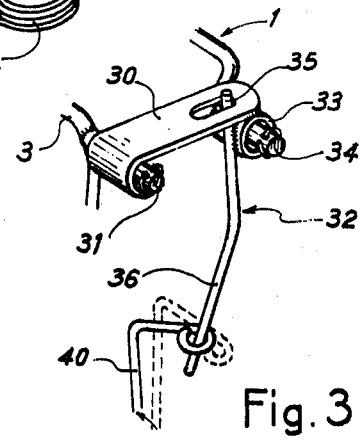
FIG. 3 is an enlarged perspective view of the latch forming part of the animal trap of the preceding figures.
Figure 2:
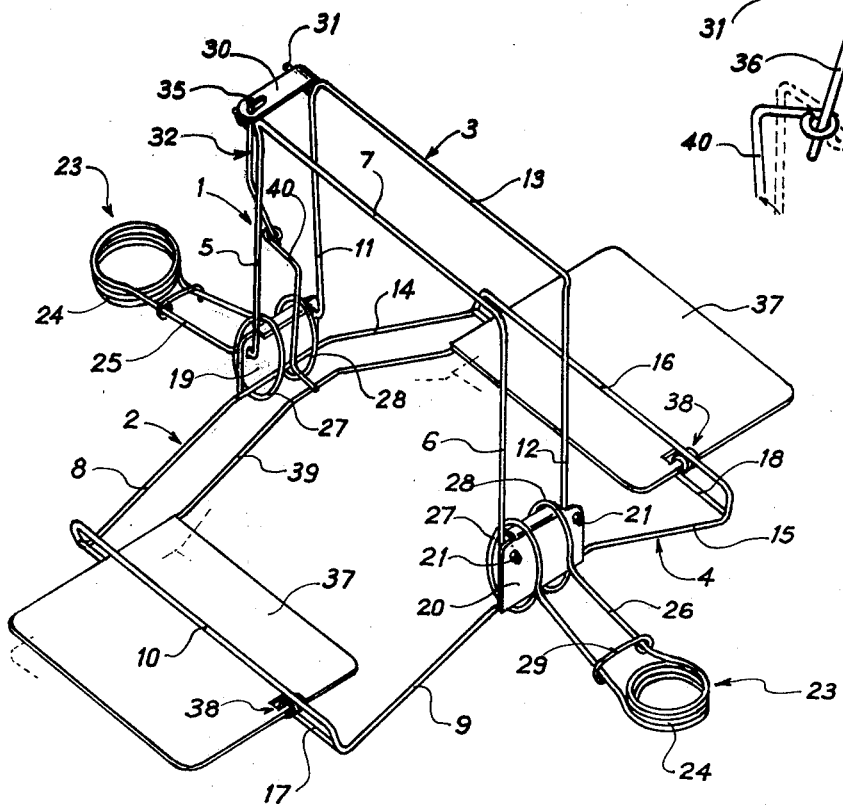
FIG. 2 is a perspective view as in FIG. 1, but showing the same in open and de-activated position.

The animal trap illustrated in FIGS. 1, 2, and 3 comprises a first pair of jaws 1 and 2 and a second pair of jaws 3 and 4. Each jaw 1, 2, 3 and 4 consists of a substantially U-shaped loop member with the loop members 1 and 3 normally overlying the loop members 2 and 4 respectively. The first U-shaped jaw 1 includes lateral arms 5 and 6 connected together by a cross bar 7. The second U-shaped jaw 2 of the first pair of jaws includes lateral arms 8 and 9 transversely connected together by a cross bar 10. Similarly, the first U-shaped jaw 3 of the second pair of jaws includes lateral arms 11 and 12 transversely connected together by a cross bar 13 and the second U-shaped jaw 4 of the second pair of jaws includes lateral arms 14 and 15 transversely connected together by a cross bar 16.

As may be seen in the drawings, the two pairs of jaws are similar but reversed into back-to-back position relative to each other. Thus, the two first jaws 1 and 3 are similar while the two second jaws 2 and 4 are similar.

Preferably, the cross bars 10 and 16 of the second jaws 2 and 4 are offset from the corresponding lateral arms 8, 9 and 14, 15 respectively. This raises the cross bars 10 and 16 to ensure that they will be reached by the cross bars 7 and 13 respectively upon downward pivoting of the first jaws. Besides, the offset cross bars 10 and 16 are thus placed to allow space for auxiliary cross bars 17 and 18 arranged in underlying spaced-apart relationship relative to the bars 10 and 16 respectively.

The two second U-shaped jaws 2 and 4 are integrally formed of a single wire or rod bent in the form of a generally rectangular frame, thereby securing the jaws in the afore-mentioned back-to-back relationship. A pair of plates 19 and 20 are positioned on opposite sides respectively of the afore-mentioned frame defined by the jaws 2 and 4 and have the joined ends of the lateral arms 8, 14 and 9, 15 rigidly secured thereto such as by welding. The free ends 21 of the lateral arms 5, 6, 11, and 12 are pivotally inserted through the plates 19 and 20 and define the pivot axes of the pivotable jaws 1 and 3. These pivot axes extend transversely of the trap and allow pivoting of the overlying first jaws 1 and 3 toward and away from each other between an upstanding open position and a lowered closed position, shown in FIGS. 2 and 1 respectively.

Each of the plates 19 and 20 is formed with an abutment 22 defined by an inwardly bent portion of the plate. The opposite ends of each inwardly bent abutment portion 22 form shoulders provided to limit the pivoting movement of first jaws toward one another, as best shown in FIG. 2.

A pair of helical springs 23 is provided to produce the closing action of the first jaws 1 and 3 and are positioned on opposite sides respectively of the trap. Each helical spring 23 is made of a spring wire generally arranged in a V configuration. Each spring 23 includes a spring coil 24 at the base of the V with a pair of ends 25 and 26 radially projecting away from the spring coil. These ends 25 and 26 terminate into a loop 27, 28 respectively which encircle the corresponding lateral arms of the corresponding first and second jaws. Thus, one spring 23 on one side of the jaws, has its loop 27 encircling the lateral arms 5 and 8 and its loop 28 encircling the lateral arms 11 and 14. The other spring 23 on the opposite side of the jaws has its loop 27 encircling the lateral arms 6 and 9 and its loop 28 encircling the lateral arms 12 and 15.

Preferably, when the jaws are in the closed position, each pair of arms 5, 8; 6, 9; 11, 14; and 12, 15 diverge slightly toward the cross bars such that the outer ends of the arms of each pair are farther apart than the diameter of the loops 27 and 28. This holds the latter against slipping off the outer ends of the arms when the springs are relaxed.

A safety hook 29 is connected to one end 25 or 26 of each spring and adapted to hook onto the other end of the same spring, such as to provide a safety lock to hold the springs while the jaws 1 and 3 are being set in open position. After the trap has been opened or set, the hooks 29 must be released to allow closing of the trap.

A latch is provided to releasably hold the two first jaws 1 and 3 in the upstanding open position of FIG. 2. This latch includes a female member in the form of an apertured tongue 30 pivoted on a stud 31 projecting outwardly from the jaw 3 substantially parallel to the pivot axis of the latter. The latch further includes a male member in the form of a rod 32 rigidly secured to a sleeve 33, such as by welding. The sleeve 33 is rotatably mounted on a further stud 34 projecting laterally of the jaw 1 substantially parallel to the pivot axis of the latter. The opposite ends of the rod 32 form radial projections 35 and 36. The radial projection 35 is adapted to operatively and latchingly engage into the aperture of the tongue 30, when the jaws 1 and 3 are in upstanding juxtaposed position.

A pair of treadle plates 37 are pivoted at 38 to the underlying cross bars 17 and 18 respectively. Both these treadle plates are pivoted about an axis extending longitudinally of the trap as compared to the pivot axes of the jaws 1 and 3 which extend transversely of the trap. A bridge wire or connector 39 interconnects the two plates 37. A triggering finger or wire 40 is secured at its lower end to the connector 39 and has its upper end operatively looping around the downward projection 36 of the male latch member or rod 32.

When the jaws 1 and 3 are in the open position of FIG. 2, the latching is completed by engagement of the end 35 in the aperture of the tongue 30 and by insertion of the terminal loop of the trigger wire 40 around the projection 36 and such that the treadle plates 37 are hung by the wire 40 engaging the projection 36.

When an animal steps on either of the plates 37, the same is lowered, causing the trigger wire 40 to disengage and release the projection 36. Then, the bias of the springs 23 exerts a pull on the tongue 30 which is now allowed to pivot the rod 32, thereby disengaging the projection 35 from the aperture of the tongue. The springs 23 then swiftly pivot the two first jaws 1 and 3 to their closed position in overlying registry with the fixed jaws 2 and 4 respectively.

The treadle plates are placed in predetermined locations at the outline of the fixed jaws 2 and 4, such that when an animal steps on one plate 37, its neck will be in the path of either one of the two cross bars 7 and 13 which will then strike at the neck of the animal for most effective action.

Figure 4:
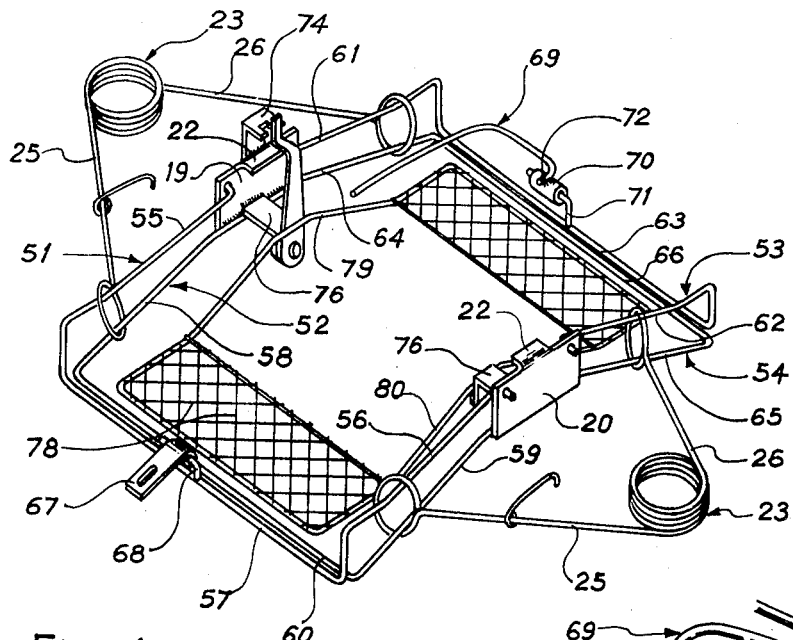
FIG. 4 is a perspective view of an animal trap according to a second embodiment of the present invention and shown in closed position.
Figure 6:
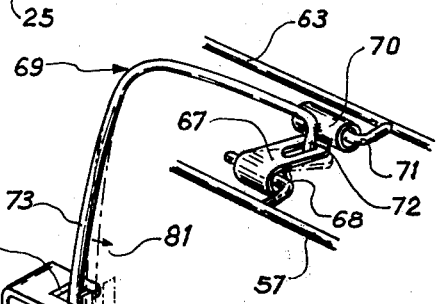
FIG. 6 is an enlarged perspective view of the latch and trigger assembly forming part of the animal trap of FIGS. 4 and 5.
Figure 5:
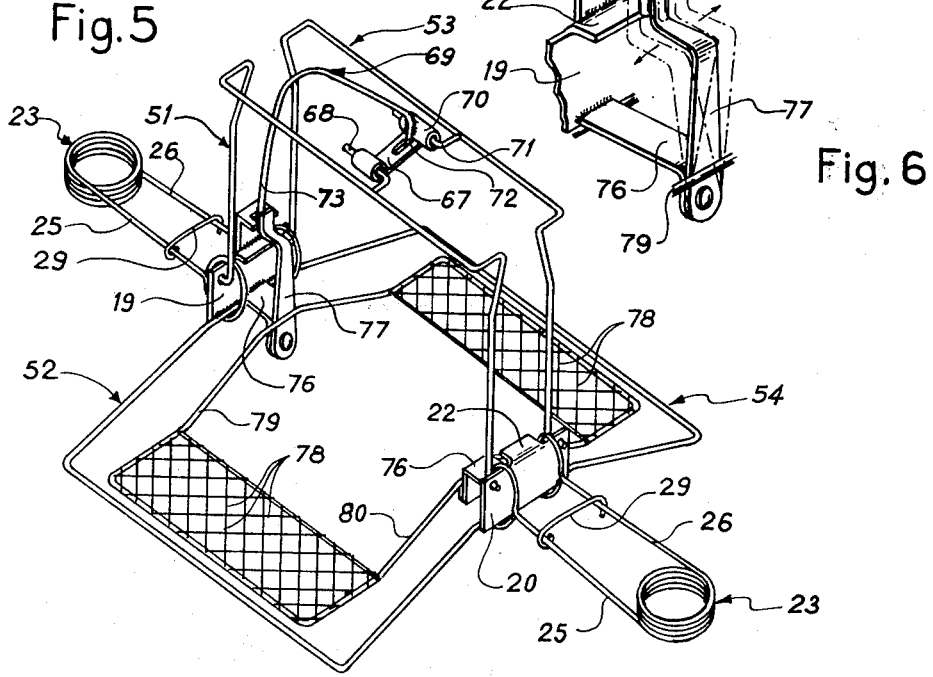
FIG. 5 is a perspective view as in FIG. 4 but with the same trap this time shown in open and de-activated position.

The animal trap of the second embodiment of the invention, illustrated in FIGS. 4, 5, and 6, comprises a first pair of jaws 51 and 52 and a second pair of jaws 53 and 54. Each jaw 51, 52, 53, and 54 consists of a substantially U-shaped loop member with the loop members 51 and 53 normally overlying the loop members 52 and 54 respectively. The first U-shaped jaw 51 includes lateral arms 55 and 56 connected together by a cross bar 57. The second U-shaped jaw 52 of the first pair of jaws includes lateral arms 58 and 59 transversely connected together by a cross bar 60. Similarly, the first U-shaped jaw 53 of the second pair of jaws includes lateral arms 61 and 62 transversely connected together by a cross bar 63 and the second U-shaped jaw 54 of the second pair of jaws includes lateral arms 64 and 65 transversely connected together by a cross bar 66.

As may be seen in the drawings, the two pairs of jaws 51, 52 and 53, 54 are similar but reversed in back-to-back position relative to each other. Thus, the two first jaws 51 and 53 are similar while the two second jaws 52 and 54 are similar.

Preferably, the cross bars 57 and 63 of the first jaws 51 and 53 are offset from the corresponding lateral arms 55, 56, and 61, 62 respectively. This lowers the cross bars 57 and 63 to ensure that they reach the cross bars 60 and 66 respectively upon downward pivoting of the first jaws.

The two second U-shaped jaws 52 and 54 are integrally formed of a single wire or rod bent in the form of a generally rectangular frame, thus securing these jaws in back-to-back relationship.

The animal trap of the second embodiment also includes the pair of plates 19 and 20 having the arms 55, 56, 58, 59, 61, 62, 64, and 65 secured thereto similarly as the corresponding arms in the first embodiment. The animal trap of the second embodiment also includes the springs 23 and the hooks 29 constructed and arranged with the associated arms as aforedescribed in relation with the first embodiment.

Preferably, when the jaws 51 and 53 are in the closed position, the arms of the jaws also diverge as aforedescribed and for the same purpose as for the first embodiment.

A latch is provided to releasably hold the two first jaws 51 and 53 in the upstanding open position of FIG. 5. This latch includes a female member in the form of an apertured tongue 67 pivoted on a stud 68 secured to the cross bar 57 and having the operative portion thereof extending substantially parallel to the pivot axis of the jaw 51. This latch further includes a male member in the form of a rod 69 rigidly secured to a sleeve 70, such as by welding. The sleeve 70 is rotatably mounted on a further stud 71 having the operative portion projecting substantially parallel to the pivot axis of the jaw 53. The opposite ends of the rod 69 form opposite projections 72 and 73. The projection 72 is adapted to operatively and latchingly engage into the aperture of the tongue 67, when the jaws 51 and 53 are in upstanding juxtaposed position.

A bracket 74 is secured to the support plate 19 and has a notch 75 therein opening toward the other support plate 20. An L-shaped bracket 76 is secured to each support plate 19 and 20 and projects inwardly of the animal trap. A triggering finger, or upstanding lever 77, is pivoted to the L-shaped bracket 76 of the plate 19 about an axis extending substantially parallel to the pivot axis of the jaws 51 and 53. The trigger member 77 is arranged to close the open end of the notch 75 and thus hold the projection 73 captive therein, as shown in FIG. 5.

A pair of treadle platforms 78 is secured to the opposite ends respectively of a wire or tubular frame including a pair of laterally opposite edge portions 79 and 80. The edge portion 79 is rigidly secured to the trigger member 77 and the edge portion 80 is pivoted to the L-shaped bracket 76 of the support plate 20. Thus, the treadles 78 and the supporting tubular or wire frame are pivoted about the axis of the trigger member 77 and bodily with the latter.

The latching of the jaws 51 and 53 in the open position, as shown in FIG. 5, includes engagement of the end 72 in the aperture of the tongue 67; the insertion of the end 73 in the notch 75; and closing of the latter with the upper end of the trigger member which is frictionally held in place under the transverse biasing action of the end 73. The springs 23 are then held in compression and may be safely neutralized or deactivated by the hooks 29.

When an animal steps on either of the two treadles or platforms 78, the same is lowered and pivoted with the trigger finger 77 which thus opens the notch 75 and frees the end 73, which springs out of the notch, as shown by the arrow 81 in FIG. 6. Then, the action of the springs 23 on the jaws 51 and 53 produces pivoting of the rod 69 and disengagement of the end 72 from the aperture of the tongue 67. The latch is thus fully released and the springs 23 swiftly pivot the two first jaws 51 and 53 to their closed position in overlying registry with the fixed jaws 52 and 54 respectively.

What is claimed is:

1. An animal trap comprising a first and a second pairs of jaws connected in fixed back-to-back spatial relationship relative to each other and having each one pivoting jaw opening angularly away from the corresponding other jaw and toward the one pivoting jaw of the other pair of jaws, spring means connected to said one jaws and biasing the latter angularly away from each other toward closing thereof relative to the other jaws respectively, latch means selectively setting said one jaws in open adjoining relationship, a treadle positioned at the outline of each of said pairs of jaws, and trigger means connected to said treadles and releasably holding said latch means and releasing the latter in response to actuation of any of said treadles, thereby to allow an animal to trigger the closing of said pairs of jaws upon stepping on any of said treadles said latch means including a female latch member carried by the one jaw of said second pair of jaws, and a male latch member pivoted to the one jaw of said first pair of jaws about an axis extending lengthwise of the pivot axis of the latter one jaw, said male latch member including a first and a second radial projection releasably engageable with said female latch member and with said trigger means respectively.

2. An animal trap as defined in claim 1, wherein said trigger means includes an upstanding trigger member connected to said treadles for displacement therewith and releasably abutting said second radial projection upon latching of the latch members.

3. An animal trap as defined in claim 2, wherein said one jaw and said other jaw of each pair of jaws constitute a first and second loop members respectively, said second loop members are fixedly connected in mutually converging relationship relative to each other, and said first loop members are pivotally connected to said second loop members and project outwardly on one side relative to the latter.

4. An animal trap as defined in claim 3, wherein said spring means includes a pair of springs arranged on opposite sides respectively of the pairs of jaws, each of said springs constitutes a helical spring having opposite ends operatively engaging said one jaws respectively and biasing the latter angularly away from each other toward the other jaws respectively, and each of said opposite ends of said springs is looped around and slidable along a pair of angularly cooperating lateral arms of the jaws respectively of one of said pairs of jaws and is arranged into outward biasing engagement with said arms.

5. An animal trap as defined in claim 3, wherein each of said treadles constitutes a plate pivoted to one of said other jaws, a link interconnects said plates away from the pivot axis thereof, and said upstanding member is rigidly secured to said link and adapted to downwardly displace upon downward pivoting of either of said plates.

6. An animal trap as defined in claim 5, wherein said second loop members cooperatively form an elongated closed perimeter frame including a pair of cross bars at the opposite ends thereof respectively, and said treadles are pivotally connected to said cross bars.

7. An animal trap as defined in claim 2, wherein said upstanding trigger member is pivotally connected to said other jaws about an axis extending lengthwise of the pivot axes of said one jaws and said treadles are connected to said upstanding trigger member for pivotal displacement therewith about the axis thereof.

8. An animal trap as defined in claim 7, further including a wire frame defining a pair of opposite edge portions pivotally connected relative to said other jaws and having one of said opposite edge portions rigidly secured to said upstanding trigger member for said pivotal displacement therewith, and said treadles constitute a pair of platforms secured to the opposite ends respectively of said opposite edge portions.

9. An animal trap as defined in claim 8, further including a pair of supports fixedly secured to said other jaws and having said one jaws pivoted thereto, one of said supports having said upstanding trigger member pivoted thereto and forming a notch facing toward the latter, and said second radial projection engaging into said notch in releasable abutment with said upstanding trigger member upon latching of the latch members.

* * * * *